United States Patent [19]
Palermo et al.

[11] Patent Number: 5,912,925
[45] Date of Patent: Jun. 15, 1999

[54] DIVERSITY CIRCUIT FOR MAGNETIC COMMUNICATION SYSTEM

[75] Inventors: Vincent Palermo, Westford; Patrick J. Cobler, Belmont; Neal R. Butler, Acton, all of Mass.

[73] Assignee: Aura Communications, Inc., Wilmington, Mass.

[21] Appl. No.: 08/696,812

[22] Filed: Aug. 13, 1996

Related U.S. Application Data

[63] Continuation-in-part of application No. 08/444,017, May 18, 1995.

[51] Int. Cl.⁶ .................................................. H04B 3/00
[52] U.S. Cl. ........................... 375/258; 375/352; 455/41; 455/139; 455/276.1
[58] Field of Search ................................... 455/137, 139, 455/41, 273, 274, 276.1; 375/347, 257, 258, 352

[56] References Cited

U.S. PATENT DOCUMENTS

| | | | |
|---|---|---|---|
| 3,617,890 | 11/1971 | Kurauchi et al. | 325/51 |
| 3,898,565 | 8/1975 | Takeuchi et al. | 325/28 |
| 4,061,972 | 12/1977 | Burgess | 325/16 |
| 4,117,271 | 9/1978 | Teeter et al. | 179/82 |
| 4,160,952 | 7/1979 | Seastrand, Jr. | 325/369 |
| 4,334,316 | 6/1982 | Tamaka | 455/139 |
| 4,373,207 | 2/1983 | Hecken | 455/139 |
| 4,442,434 | 4/1984 | Baekgaard | 343/701 |
| 4,489,330 | 12/1984 | Marutake et al. | 343/742 |
| 4,513,412 | 4/1985 | Cox | 370/29 |
| 4,542,532 | 9/1985 | McQuilkin | 455/78 |
| 4,584,707 | 4/1986 | Goldberg et al. | 455/41 |
| 4,600,829 | 7/1986 | Walton | 235/439 |
| 4,647,722 | 3/1987 | Nishida et al. | 379/63 |
| 4,654,883 | 3/1987 | Iwata | 455/89 |
| 4,669,109 | 5/1987 | LeCheviller et al. | 379/143 |
| 4,733,402 | 3/1988 | Monsen | 375/100 |
| 4,747,158 | 5/1988 | Goldberg et al. | 455/11 |
| 4,752,776 | 6/1988 | Katzenstein | 340/825.54 |
| 4,918,737 | 4/1990 | Luethi | 381/68.4 |
| 4,939,791 | 7/1990 | Bochmann et al. | 455/276.1 |
| 4,967,695 | 11/1990 | Giunta | 119/29 |
| 5,054,112 | 10/1991 | Ike | 455/41 |
| 5,276,686 | 1/1994 | Ito | 370/95.1 |
| 5,276,920 | 1/1994 | Kuisma | 455/101 |
| 5,390,357 | 2/1995 | Nobusawa et al. | 455/134 |
| 5,437,057 | 7/1995 | Richley et al. | 455/41 |
| 5,553,312 | 9/1996 | Gattey et al. | 455/11.1 |
| 5,568,516 | 10/1996 | Strohallen et al. | 375/259 |
| 5,615,229 | 3/1997 | Sharma et al. | 375/259 |
| 5,722,050 | 2/1998 | Chen | 455/66 |
| 5,771,438 | 6/1998 | Palermo et al. | 455/41 |

FOREIGN PATENT DOCUMENTS

| | | |
|---|---|---|
| 02 96 092 | 12/1988 | European Pat. Off. . |
| 0700184A2 | 3/1996 | European Pat. Off. . |
| 2431227 | 7/1978 | France . |
| 78/20886 | 7/1978 | France . |
| 93 09 032 | 12/1994 | Germany . |
| 29609349 | 12/1996 | Germany . |
| 36 03 098 | 1/1997 | Germany . |
| 1164281 | 9/1966 | United Kingdom . |
| 2197160 | 5/1988 | United Kingdom . |
| 2277422 | 10/1994 | United Kingdom . |
| 92/17991 | 10/1992 | WIPO . |
| 96/37052 | 11/1996 | WIPO . |

OTHER PUBLICATIONS

Plantronics advertisement, Santa Cruz, CA, 1994, 1 page.
Jabra advertisement, San Diego, CA, 1994, 1 page.
Fujitsu advertisement, Reader Service No. 14, 1 page.
Hello Direct advertisement, 1 page.

*Primary Examiner*—Don N. Vo
*Attorney, Agent, or Firm*—Testa, Hurwitz & Thibeault, LLP

[57] ABSTRACT

A magnetic communication system includes a transmitter have a single coil transducer, and a receiver having a three orthogonally oriented coil transducers. The signal processing circuitry in the receiver adjusts the phases of the signals received by the three transducers to produce signals which are in-phase. The signals are then summed to provide an output signal from the receiver. The processing circuitry adjusts the phases of the incoming signals either serially or in parallel. Transmissions from the receiver to the transmitter are also phase adjusted in accordance with the same adjustments used in reception.

7 Claims, 8 Drawing Sheets

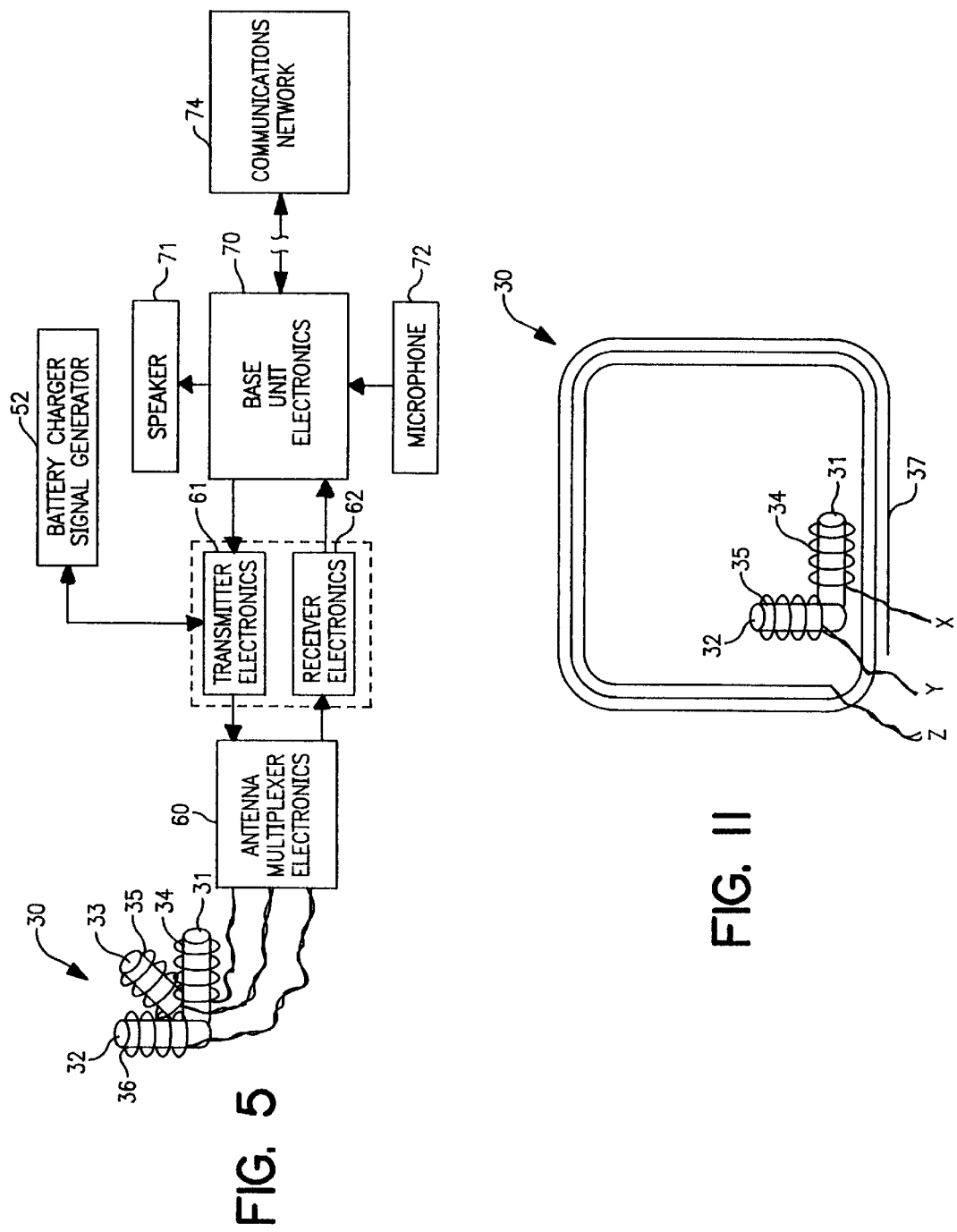

DIVERSITY CIRCUIT FOR MAGNETIC COMMUNICATION SYSTEM

CROSS-REFERENCE TO RELATED APPLICATION

This is a continuation-in-part of U.S. patent application Ser. No. 08/444,017, filed May 18, 1995.

BACKGROUND OF THE INVENTION

1. Field of the Invention

The present invention relates to magnetic communication systems. More particularly, it relates to a magnetic communication system which eliminates nulls in a mutual inductance field through a combination of signals from multiple transducers.

2. Discussion of the Related Art

When using a telephone, continually holding the handset to one's ear can be awkward. Also, holding the telephone interferes with the use of both hands for other work while trying to talk. In particular, the use of cellular telephones, which has increased dramatically, can interfere with the user's proper operation of an automobile. Various techniques have been used to overcome these difficulties.

Speaker phones allow one to talk while roaming around a room and using one's hands. However, speaker volume can disturb others around the user. They also cannot be used in close proximity to other speaker phones due to interference. They have limited privacy since the speaker broadcasts the conversation to all within earshot. Typically, the user must speak more loudly than normal to have proper reception at the microphone. Also, they tend to have poor sound quality because the user is not near the microphone and acoustics in the room are poor.

Headsets have been another way to free up the hands of a telephone user. Typically, the headset includes an adjustable strap extending across the user's head to hold the headset in place, at least one headphone located by the user's ear, and a microphone which extends from the headset along and around the user's face to be positioned in front of the users mouth. The headset is attached by a wire to the telephone. Headsets have the disadvantages of being bulky and somewhat awkward to use. Although they permit hands free use of the telephone, the user has limited mobility due to the connecting wire.

Wireless headsets have also been developed which eliminate the connecting wire to the telephone. The wireless headset uses radio frequency (RF) technology or infrared technology for communicating between the headset and a base unit connected to the telephone. The need for communications circuitry and sufficient power to communicate with the base unit increases the bulk and weight of the headset. This increased weight can become tiresome for the user. One alternative has been to attach the headset by a wire to a transmitting unit worn on the belt of the user. As with wired headsets, the wire can become inconvenient and interfere with other actions by the user. Significant interference rejection circuitry is also needed when multiple wireless headsets are used in close proximity.

Magnetic induction fields can be used to provide a communication link between a base unit and a headset. However, magnetic induction fields suffer from signal nulls at certain positions and orientations between the transmitter and receiver. When performing magnetic communications, a specific position and orientation between the transmitter and receiver is typically required. With a single transducer at the transmitter and receiver, certain positions and orientations result in no signal being received due to nulls in the mutual inductance between the transducers. The signal can be recovered by reorienting one of the transducers. It is also possible to use multiple, orthogonally positioned coils at the transmitter or receiver so that at least one coil does not have a null. Different mechanisms have been used to select or combine outputs from the transducers in order to provide communications.

In U.S. Pat. No. 4,489,330, a four coil transducer receiver includes a mercury switch array for selecting a coil transducer. As the receiver is moved, the switch array activates to pick up the positive phase components from the coils. However, this system cannot compensate for changes in position and orientation of the transmitter, and, thus, requires a stationary transmitter. Also, the mercury switch array is large, costly, and sometimes unreliable. Furthermore, switching transients occur as different coils are selected, which causes degradation of the signal and possible loss of information.

In U.S. Pat. No. 4,967,695, a three axis magnetic induction system used as a proximity detector is described. In this system, the outputs of the three coils are combined to provide a single received signal. While this system eliminates switching transients, it has other deficiencies. Since the output signal reverses polarity when it is rotated 180 degrees, the summed signal can be zero in some situations. Thus, the nulls present in the single transducer system are merely repositioned. Furthermore, the simple summing of signals from all three transducers can increase noise levels. For a proximity detector, noise is not a significant concern because it is merely attempting to determine the existence of a signal. Much better signal to noise ratios are needed in order to receive communication signals.

SUMMARY OF THE INVENTION

The deficiencies of prior art systems are overcome in great part by the present invention which, in one aspect, includes a short-range, wireless communication system including a miniaturized portable transceiver and a base unit transceiver. The miniaturized portable transceiver sends and receives information through magnetic induction to the base unit, which may also be portable. Similarly, the base unit sends and receives information through magnetic induction to the portable transceiver. The information can be voice, data, music, or video. Use of magnetic induction fields reduces the power requirements and thus allows a smaller size and greater convenience.

In another aspect of the present invention, the base unit or portable device may include multiple, orthogonally arranged transducers for generating multiple magnetic fields. The multiple fields substantially eliminates mutual inductance nulls between the base unit and portable unit which result at certain positions in a generated field. In another aspect of the present invention, the multiple transducers may be selectively operated based upon a strongest signal, in order to limit power consumption and improve signal reception. The signals from the transducers are electronically scanned. The signals are then phase adjusted and combined to achieve a maximum signal level. In another aspect of the invention, the same phase information is used for a transmitted signal. This allows the other device to use a single transducer while maintaining a high signal to noise ratio.

In another aspect of the present invention, the magnitude of the incoming signals is used for selective transmission on one or more of the transmission transducers. The amplitude of the signal from each of the transducers is determined. This amplitude information is used for selecting one or more drivers for the transmission transducers corresponding to the greatest amplitude.

In another aspect of the present invention, a headset contains the miniaturized transceiver which communicates with the base unit through magnetic induction fields. In another aspect of the present invention, the headset may be of the concha type in which the speaker fits into the user's ear without a strap across the head and the transceiving transducer is encapsulated into the microphone boom which is short and straight along the user's cheek. In another aspect of the invention, the base unit may be a portable telephone, which can be attached to the user, to further transmit communications from the wireless communication system to a cellular telephone network or a cordless telephone unit.

In another aspect of the invention, the communication system is half-duplex where the base and headset alternately transmit and receive digital audio. In another aspect the communication system is a simplex system where the receiver has multiple transducers.

With these and other objects, (a) advantages and features of the invention that may become apparent, the nature of the invention may be more clearly understood by reference to the following detailed description of the invention, the appended claims and the several drawings attached hereto.

BRIEF DESCRIPTION OF THE DRAWINGS

FIG. 5 illustrates schematically the transducer and electronics of the base unit.

FIG. 11 illustrates an alternative transducer configuration for the base unit.

DETAILED DESCRIPTION

Figure 1:
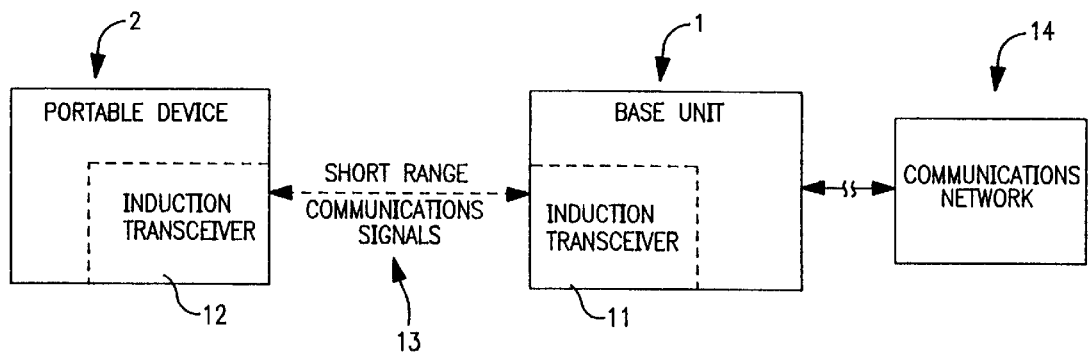
FIG. 1 illustrates schematically the wireless communication system of the present invention.

FIG. 1 illustrates schematically a short-range magnetic communication system 1 including a portable device 2 and a base unit 1, which connects to a long-range communication network 14. Contained within each of the base unit 1 and the portable device 2 is a short-range miniaturized magnetic induction transceiver 11, 12, which can simultaneously transmit and receive communications signals 13. These signals may be voice, audio, data, or video. The communications network 14 may be any network in which it would be desirable for these signals to be communicated over a terminal link without wires, such as a telephone network, personal communications (PCS) network, special mobile radio (SMR) network, computer system or network, and video conferencing systems. The base unit 1 may any part of the communications network 14 from which it would be desirable to communicate to another device without wires; for example, it may be a telephone handset, PCS handset, SMR handset, walkie-talkie, computer or computer peripheral devices, personal digital assistant (PDA), or video game controller. The portable device 2 may be any device from which it would be desirable to communicate without wires to a communications network; for example, it may be a telephone headset or handset, portable computer or computer peripheral device, headphone, or video input device.

Figure 2:
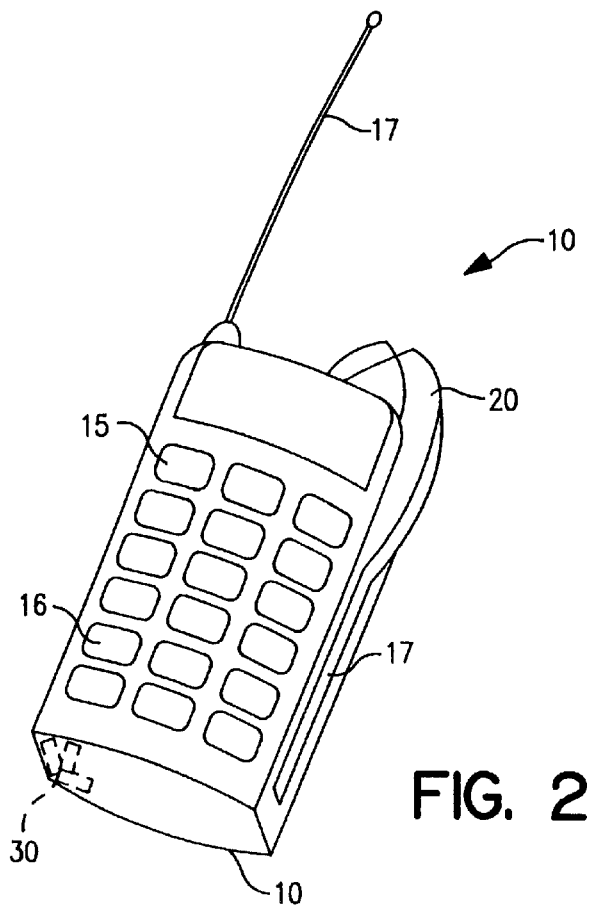
FIG. 2 illustrates a telephone handset as the base unit in the communication system of FIG. 1.

As illustrated in FIG. 2, one example of the base unit 1 is a portable telephone 10 having a plurality of number buttons 15 and a plurality of function buttons 16. A retractable transducer 17 communicates with a cellular telephone network or a cordless telephone base unit. The portable telephone 10 operates in a manner similar to that of an ordinary cellular or cordless telephone handset. Signals are sent to and received from the telephone network in an ordinary manner. The portable telephone 10 includes a transducer system 30 which communicates by magnetic induction with headset 20, which operates as the portable device 2, to provide the outputs and inputs to the portable telephone 10. The portable telephone 10 may also include a mouthpiece or earpiece (not shown) as in a regular telephone handset, allowing the user to choose between a conventional method of operation and a hands-free use afforded by the headset 20.

Figure 3:
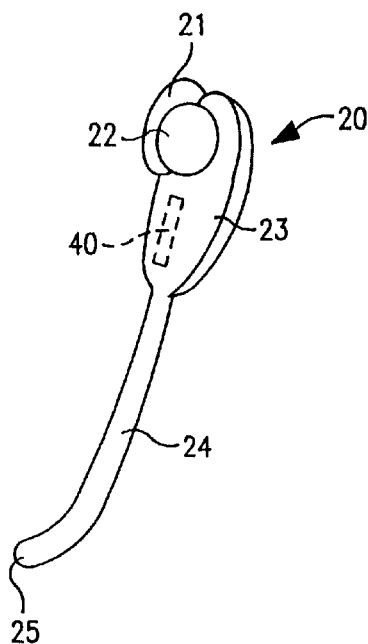
FIG. 3 illustrates a headset that is utilized as the portable device in the communication system of FIG. 1.

The portable device 2 as a headset 20 is illustrated more fully in FIG. 3. It includes a body portion 23 which houses a transducer 40 and processing circuitry. A speaker 22 is connected to the circuitry within the body 23. An earpiece 21 next to the speaker 22 fits in the user's ear to hold the unit in place and to allow the user to hear sounds from the speaker. A microphone boom 24 extends from the body 23 several inches in order to place a microphone 25, located at the end of the boom 24, close to the user's mouth. Alternatively the transducer 40 may be housed in the boom 24. A rechargeable battery 51 is also housed in the body 23 of the headset 20 to provide power to the headset. Other features may be optionally included in the headset 20, such as switcher or buttons for manually activating different modes. For example, a capacitive switch or push-button could be used to cause the headset 20 to transmit a control signal to the portable phone 10 to activate muting of the microphone. The portable phone 10 may include a receptacle 19 for receiving and holding the headset 20. Depositing the headset in the receptacle can provide a variety of functions, in addition to maintaining the headset 20 and portable phone 10 together. A switch can be disposed in the receptacle to terminate the telecommunication when the headset 20 is inserted or initiate the telecommunication when it is removed. The receptacle may also include connections to recharge the battery 51 in the headset 20.

The base unit 1 and portable device 2 communicate through amplitude modulation of inductive fields, although other modulation methods such as frequency, phase, or digital modulation could be employed. During use, the distance between the portable device 2 and the base unit 1 typically is short. Since the distance is short, only an inductive field is necessary, and little or no radiation occurs. This limits the operating power, which allows a smaller size and weight for the rechargeable battery 51 and, thus, the portable device 2. Furthermore, it limits interference between systems operating in close proximity. Therefore, interference rejection circuitry may be limited or not necessary in the portable device 2.

Figure 4:
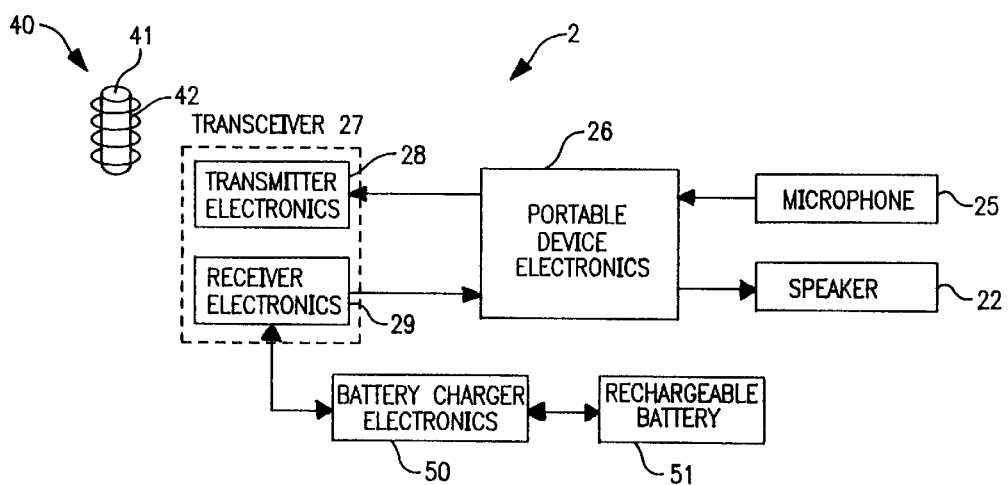
FIG. 4 illustrates schematically the transducer and electronics of the portable device.

The transducer system in the portable device 2 is illustrated schematically in FIG. 4. The transducer 40 preferably includes a ferrite rod transducer having a ferrite rod 41 within a wire coil 42. The wires from the transducer 40 are connected to a transceiver 27 having transmitter electronics 28 and receiver electronics 29. The transceiver 27 connects to the portable device electronics 26, the nature of which is dependent upon the function of the portable device 2. In the example of the portable device as a headset 20, the portable device electronics would connect to a speaker 22 and a microphone 25. Transmission and reception can occur at different frequencies, which permits full duplex operation. Alternatively, separate transmitting and receiving transducers can be used.

The base unit 1 configuration is illustrated schematically in FIG. 5. The transducer system 30 includes three orthogonally disposed ferrite rod transducers, each including a ferrite rod 31, 32, 33 and a respective coil 34, 35 and 36. The use of the orthogonally disposed transducers overcomes the occurrence of mutual inductance nulls in the resulting inductive fields. The three transducers are connected to multiplexer electronics 60 for selecting one or more of the transducers for transmission and reception. Circuitry in the multiplexer electronics may be used to select the transducer or transducers having the strongest signal for transmission and reception to reduce the total power consumption of the device. Circuitry can also be used to control the phases of signals from each of the transducers for combining the signals. Thus, the phases should be continuously adjusted to provide a maximum signal level. Alternatively, a non-zero signal can be attained simply by revising the phase of one or more signals so that all signals have the same sign.

The transmitter electronics 61 and receiver electronics 62 provide for processing of the communications signals from the base unit electronics 70 and the portable device 2. As discussed above, for a portable telephone 10, the conventional telephone speaker 71 and mouthpiece 72 may be eliminated so that the portable telephone 10 solely uses the headset 20 through the transducer system for communicating to the user. Switching circuitry (not shown) would be included to select between the speaker 71 and microphone 72, and the headset 20. The switching circuitry could be included in the receptacle 19 so that the speaker 71 and microphone 72 are disconnected when the headset 20 is removed.

Figure 6:
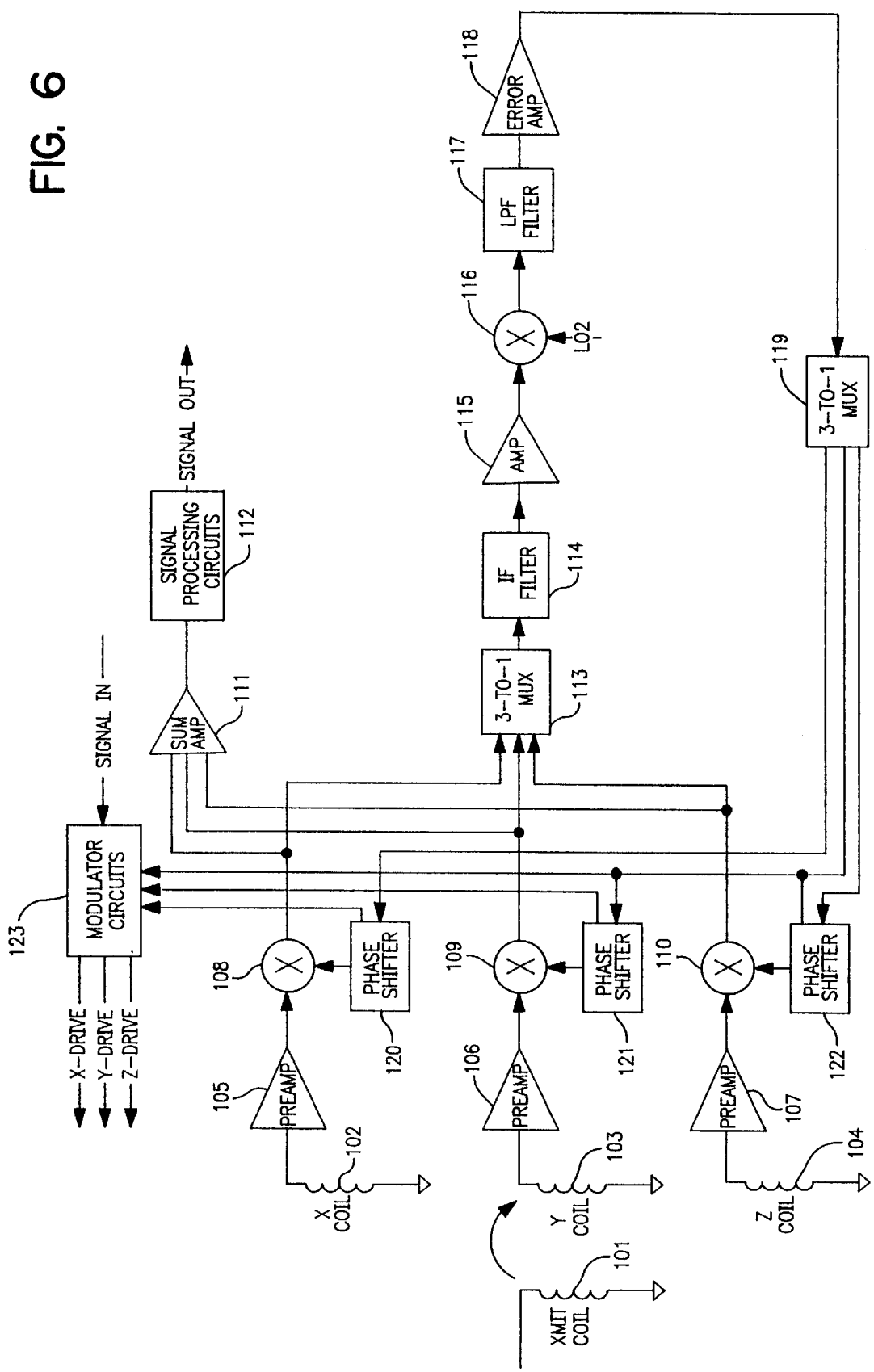
FIG. 6 illustrates an embodiment of the signal processing circuitry to combine signals from three coil transducers.

FIG. 6 illustrates an embodiment the multiplexer electronics 60 in the base unit for adjustment of the signal phases in combining signals from the three orthogonal transducers. The coil transducers 102, 103, 104, receive a signal from a transmission coil 101 in the portable device 2. Preferably, the transmission signal is a modulated carrier, nominally 500 KHz. Preamplifiers 105, 106, 107 are respectively connected to the transducer coils 102, 103, 104 in the base unit 1 to provide a modest gain to the signals. The phases of the received signals are adjusted by multiplying in mixers 108, 109, 110 the received signal by a local oscillator signal from respective phase shifters 120, 121, 122. In addition to adjusting the phases of the signals, the mixers and phase shifters shift the frequency of the signal, including the modulation signal and the carrier signal to an intermediate frequency, such as 455 KHz. The use of an intermediate frequency permits signal processing to occur at a single common frequency, regardless of the frequencies used for transmission and reception. This also allows the signal processing circuitry of the IF section to be optimized independently of the carrier frequencies. A summing amplifier 111 receives and combines the phase adjusted signals from the mixers 108, 109, 110. Since the phases of the signals can be adjusted, the summing of the three signals provides maximum signal strength, which minimizes noise and nulls. The summed signal is then provided to signal processing circuits 112 to provide an output signal for the base unit 1.

The phase adjusted signals are also processed to maintain maximum signal strength through the phase adjustment process. Various processes can be used to adjust phases. As noted above, one problem with merely summing signals from different transducers is that the signals can have different polarities which can cancel the signals when summed. One possible phase adjustment is to change polarities of signals. The polarity of each of the signals is determined. Then, the polarity of one or more signals is changed by the phase shifters 120, 121, 122 so that the polarities are always the same. Thus, when the signals are combined by the summing amplifier 111, they never cancel each other and a maximum signal is achieved.

FIG. 6 illustrates another embodiment for adjusting phases of the signals from the transducers. In this embodiment, the phases are continuously adjusted to maintain the signals in phase. The phase adjustment process compares the phases of each of the signals received on the three coils with a reference phase. A local oscillator in the phase shifter is controlled to maintain the phase of the coils coincident with the reference phase. To provide the phase adjustment process, the phase adjusted signals from the multipliers 108, 109, 110 are provided to a 3-to-1 multiplexer 113, which sequentially outputs the signals from each of the three coils as phase adjusted. The phase of the signal selected by the multiplexer is determined by passing the signal through an IF filter 114, and an amplifier 115. The filtered signal is then mixed 116 with a local reference oscillator signal. The error between the phase of the adjusted signal and the phase of the local oscillator is determined by passing the mixed signal through a low pass filter 117. The error is then amplified 118 and returned in a feedback loop through a multiplexer 119 to the appropriate phase shifter, to adjust a respective local oscillator.

According to the embodiment of the invention illustrated in FIG. 6, the phases of the signals received on the x coil, y coil, and z coil are processed sequentially. Thus, multiplexers 113 and 119 are set to select the x coil until the phase error has been reduced to a minimally acceptable level. The phases of the other two coils, y and z, are maintained while the phase of the first coil, x, is adjusted. After the phase of the x coil has been set, the multiplexers are switched to correct any phase error in the signal received by the y coil and the z coil. The phase adjustment process is fast enough to track relative movements between the transmitting coil 101 and the receiving coils 102, 103, 104. A frequency of 20 Hz has been found to be sufficient for purposes of tracking the coils.

Figure 7:
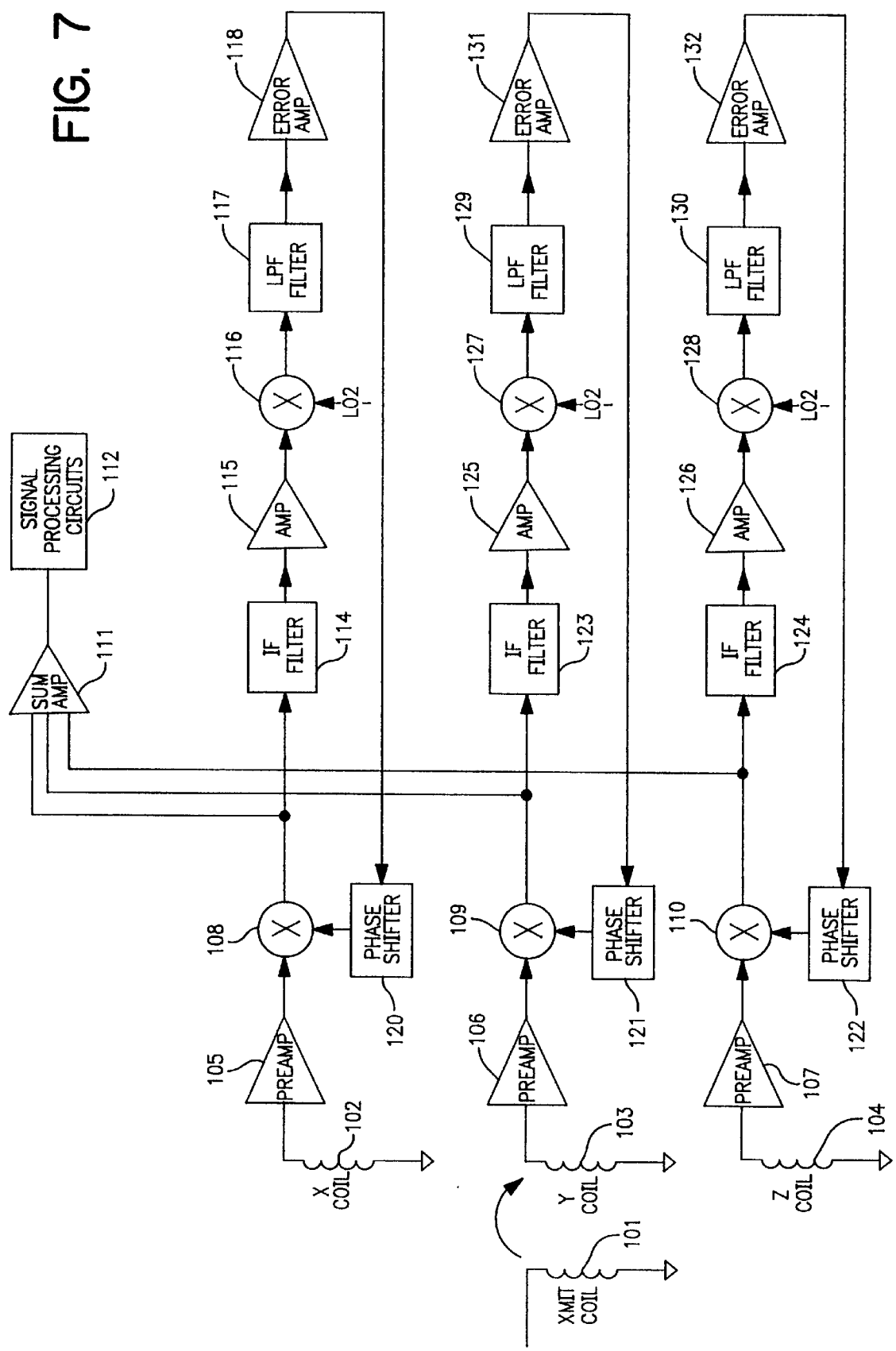
FIG. 7 illustrates a second embodiment of the signal processing circuitry to combine signals from three coil transducers.

Alternatively, if the coils are likely to be moving more quickly than can be tracked through serial phase adjustment, a phase adjusting circuit can be applied separately to each of the coils. This embodiment is illustrated in FIG. 7. Each of the mixers 108, 109, 110 is connected to a separate IF filter 114, 123, 124 and amplifier 115, 125, 126 to measure the phase of the signal received at the respective coil. Each phase is then compared with a reference phase by mixing the signal with the output of a local oscillator. Since the same oscillator is used for the signals from each of the coils, the signals will remain in phase with each other. The mixed signal from the mixers 116, 127, 128 are passed through respective low pass filters 117, 129, 130 and error amplifiers 118, 131, 132 to provide error signals representing the difference between the phase of the received signal at each coil and the reference phase. The error signals are applied to the phase shifters 120, 121, 122 to adjust the phases of each of the received signals to maintain the phase coincidence for summing. As in the prior embodiment, the phase adjusted signals are combined by the summing amplifier 111 and further processed by the signal processing circuits 112 to provide an output from the base unit 1.

Figure 8:
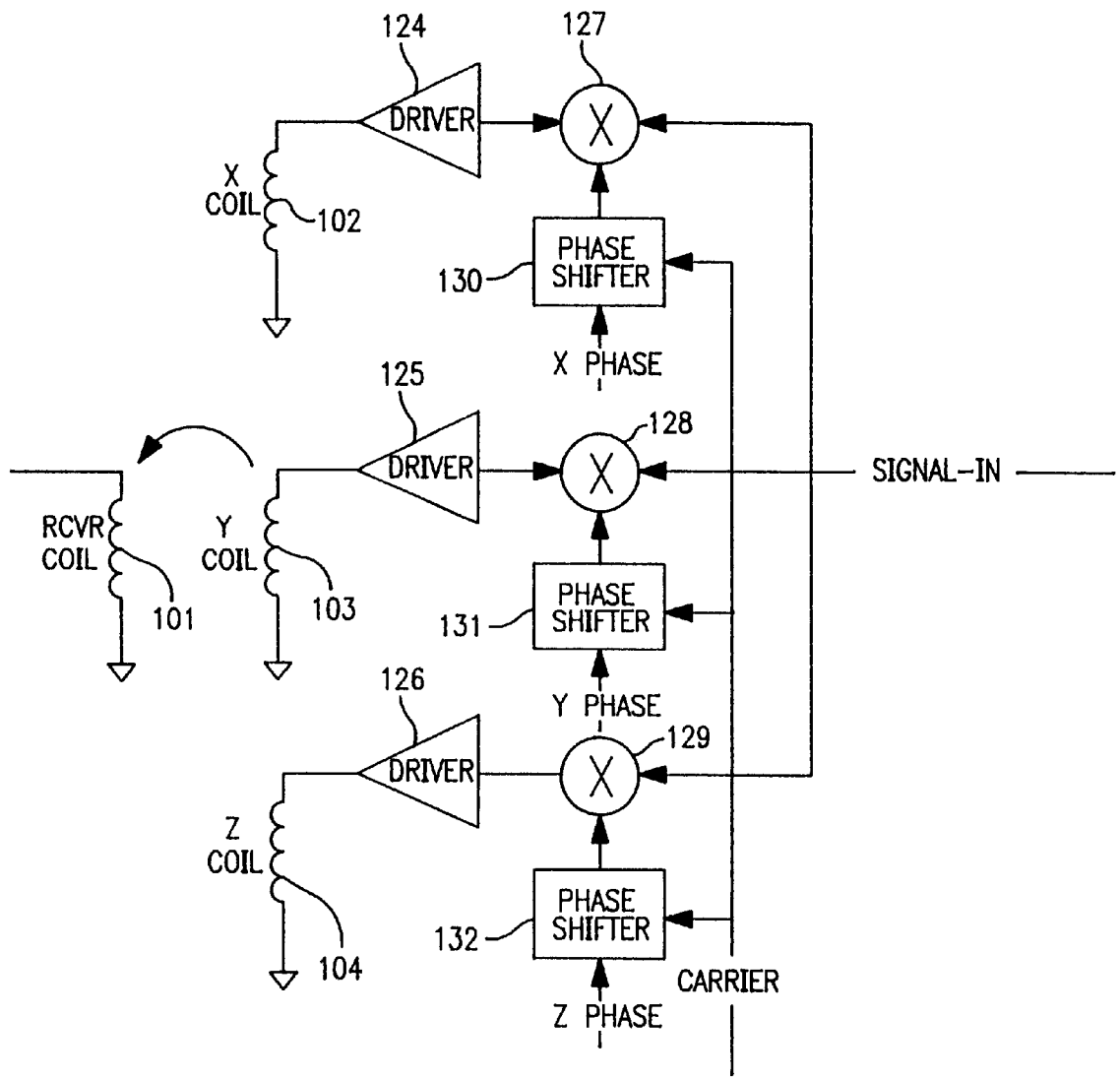
FIG. 8 illustrates the use of three transducer for transmitting signals to a single reception transducer.

The phase adjustment information used in receiving signals can also be used in driving transmission signals to provide a maximum signal level at the receiver location. Since the phases of the incoming signals are adjusted to achieve a maximum signal level, the phase adjustments define the position and orientation of the transmitting coil. The same phase adjustments on transmission compensate for this position and orientation. Thus, a single reception coil can be used. According to an embodiment of the invention, the base unit 1 includes three orthogonally positioned coil transducers with phase adjusting circuitry for both reception and transmission. The portable device, therefore, only requires a single coil transducer and can be made smaller in size. As illustrated in FIG. 6, the phase shifters output a phase adjustment to modulator circuits 123 for driving transmission signals. The modulator circuits 123 are shown more fully in FIG. 8. A signal to be transmitted is split and inputted into three mixers 227, 228, 229. Three phase shifters 230, 231, 232 receive a carrier signal and a respective phase adjustment. The phase adjustments are received from the phase shifters 120, 121, 122 in the reception circuitry. The phase shifters provide the phase adjusted carrier signal to the multiplexers 227, 228, 229, where they are multiplied by the signal to be transmitted. The resulting multiplied signals are passed to respective drivers 224, 225, 226 for the three coil transducers 102, 103, 104 for the base unit 1. When the transmitted signal is phase shifted on each of the three coil transducers, the outputs are summed magnetically in transmission to provide a maximum signal at the receiving coil 101.

Figure 9:
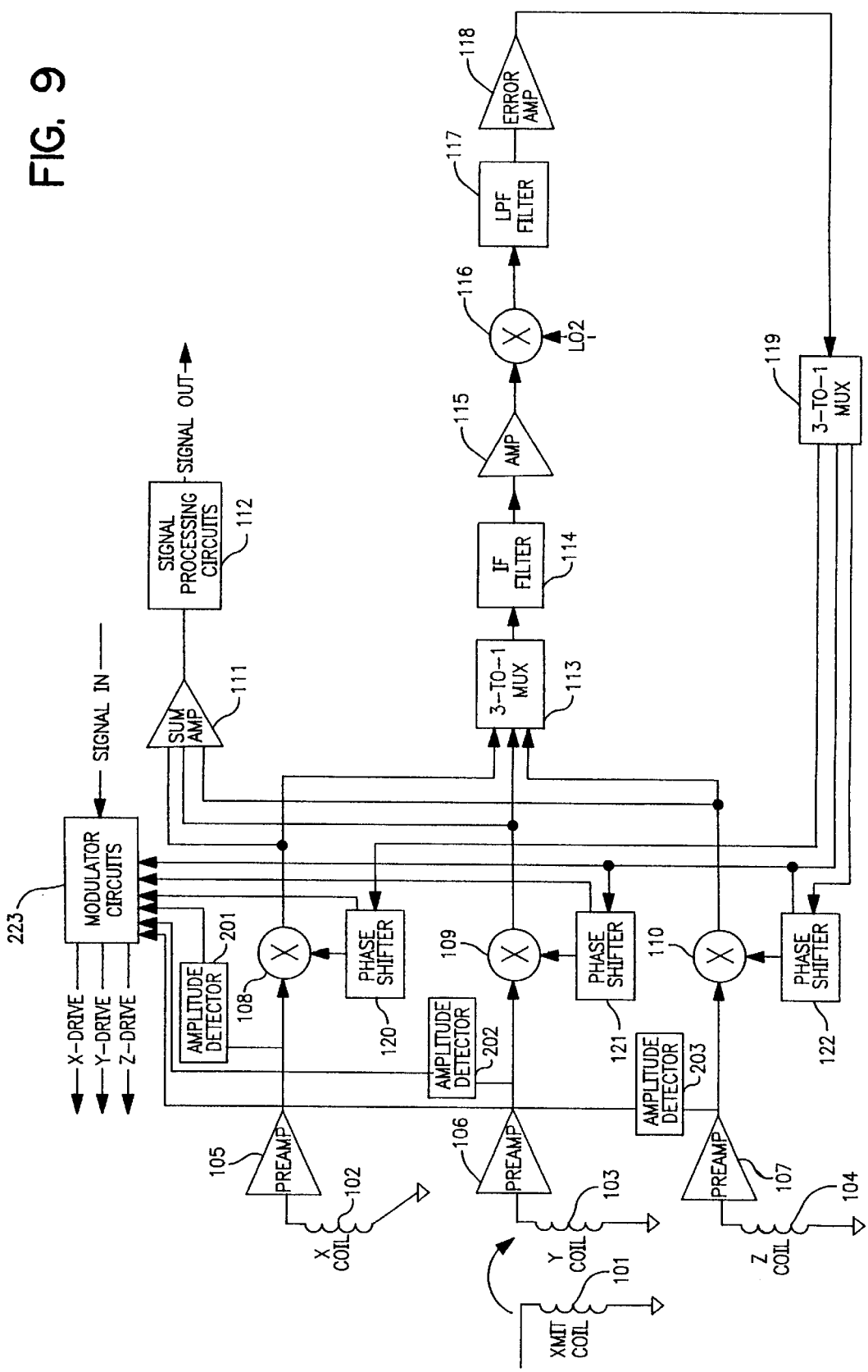
FIG. 9 illustrates a third embodiment of the signal processing circuitry to combine signals from three coil transducers.
Figure 10:
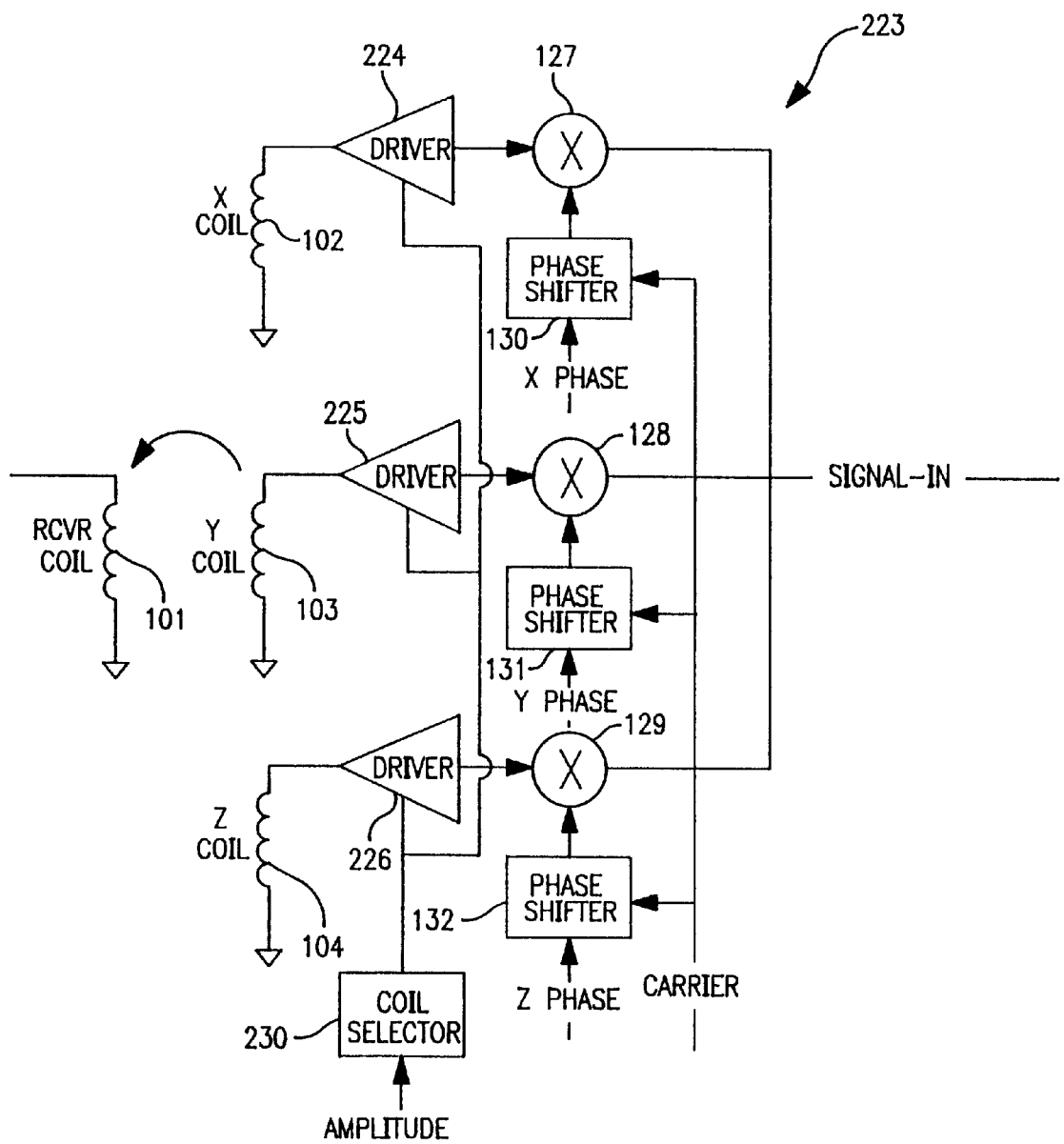
FIG. 10 illustrates the use of three transducer for transmitting signals to a single reception transducer in accordance with the signal processing circuitry of FIG. 9.

FIGS. 9 and 10 illustrate another embodiment of the present invention for selective transmission on one of the transducers. As illustrated in FIG. 9, an amplitude detector 201, 202, 203 is connected to each of the transducers 102, 103, 104. The outputs of the amplitude detectors are provided to the modulator circuits 223 for transmission. The modulator circuits 223 are illustrated in FIG. 10. The phase shifters and multipliers operate in the same manner as discussed above. The amplitude information from the amplitude detectors are provided to a coil selection circuit 230. The coil selection circuit selectively activates one of the drivers 224, 225, 226 for the coils. Thus, the coil having the strongest signal can be used for transmission, without having to energize all of the coils. Although FIG. 10 illustrates phase shifting the input signal for all of the coils, when the coils are selectively activated based upon magnitude, the phase shifters can be omitted. Alternatively, if the amplitudes are similar on two or three coils, each of these coils can be activated to increase the transmitted signal. When more than one coil is activated, phase shifting, at least as to polarity, may be needed to avoid cancellation of signals.

FIG. 11 illustrates a second embodiment of the transducer system for the base unit 1. In the transducer 30 of FIG. 6, one of the ferrite rod transducers is replaced with a loop coil transducer 37. A loop coil transducer can replace any or all of the ferrite rod transducers. The loop coil transducer 37 is disposed in the plane of the remaining ferrite rod transducers. This creates a transducer system having a decreased depth. As illustrated in FIG. 2, the three orthogonal transducers can be placed in a corner along the sides of the portable telephone 10. Alternatively, the loop coil transducer 37 could be placed along the back of the portable phone 10, so that it could made thinner.

Additionally, the transmission system can be used for charging the battery 51 of the portable device 2. The base unit 1 includes a battery charger signal generator 52 connected to the transmitter 61. This generator 52 produces a recharging signal which is sent through one of the ferrite rod transducers in the base unit 1 to the ferrite rod transducer 40 of the portable device 2. Since in the telephone embodiment of FIG. 2, the headset 20 and transducer 40 have a known orientation when in the receptacle 19, only one transducer in the portable telephone 10 needs to be energized to inductively transmit the recharging signal. As illustrated in FIG. 3, the wires from the transducer 40 in the portable device 2 are connected to a battery charger 50 which is used to charge the battery 51.

Although the communication system of the present invention has been illustrated in connection with a concha type headset 20 and a cellular or cordless telephone handset 10 as a base unit 1, it is readily adaptable for other types of headsets and uses. The headset can be of the over-the-head type, over-the-ear type, or binaural type. The system can be used as a wireless connection to a conventional desktop telephone. Such a system would operate in the manner discussed above with the cordless handset. Since several such units may be used in close proximity, interference may become more of a problem. Therefore, the system can be designed to operate on various frequencies and can select frequencies for the transmission and reception which are unlikely to have significant interference. Similarly, the system can be used with a computer, either stationary or portable, for voice data entry, sound transmission, and telephone functions. The system can also be used with other types of communication systems, including personal digital assistants (PDAs), cordless phones, PCS and SMR cellular phones, two way (video games), two-way half duplex (walkie-talkies, CBs), or two-way full duplex (phones), one way simplex headphones. When the base unit is stationary and the user is likely to be at certain locations relative to the base unit, fewer transducers may be used in the base unit without encountering mutual inductance nulls. Alternative transducer systems may also be used for generating the inductive fields. Specifically, rather than a single transducer for transmission and reception on different frequencies, separate transducers may be used.

Having thus described one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and equivalent thereto.

What is claimed is:

1. A magnetic inductance communication system, comprising:

a first transmission/reception coil producing a magnetic field including a transmitted signal;

a plurality of second transmission/reception coils having different orientations for receiving the transmitted signal and generating a plurality of received signals;

a summing circuit for combining the plurality of received signals to produce a summed signal;

at least one first phase adjusting circuit for adjusting a phase of at least one respective received signal prior to summing to increase the amplitude of the summed signal; and a modulator circuit for modulating a signal to be transmitted, wherein the modulator circuit includes:

at least one second phase adjusting circuit receiving a carrier signal and a phase adjustment signal from the at least one first phase adjusting circuit;

a plurality of driving circuits, each driving circuit receiving the signal to be transmitted and a respective output signal from one of the second phase adjusting circuits, for generating a respective driving signal on one of the plurality of second transmission/reception coils to generate a second magnetic field; and signal processing circuitry connected to the first transmission/reception coil to receive the signal in the second magnetic field.

2. The magnetic inductance communication system of claim 1, wherein said at least one second phase adjusting circuit changes polarity of the carrier signal based upon a polarity of at least one of the received signals.

3. The magnetic inductance communication system of claim 1, wherein said at least one second phase adjusting circuit adjusts the phase of the carrier signal according to phases of each of the received signals.

4. A magnetic inductance communication system comprising:

a first transmission/reception coil producing a magnetic field including a transmitted signal;

a plurality of second transmission/reception coils having different orientations for receiving a transmitted signal and generating a plurality of received signals;

a plurality of amplitude determining circuits corresponding to the plurality of second transmission/reception coils for determining amplitudes of the plurality of received signals;

a modulator circuit for modulating a signal to be transmitted, wherein the modulator circuit includes:

a plurality of driving circuits each driving circuit receiving a carrier signal to be transmitted for generating a respective driving signal on one of the plurality of transmission/reception coils to generate a second magnetic field; and a selection circuit for activating at least one of the driving circuits based upon the amplitudes of the received signals; and signal processing circuitry connected to the first transmission/reception coil to receive the signal in the second magnetic field.

5. The magnetic inductance communication system of claim 4, wherein the selection circuit activates one of the driving circuits corresponding to a transmission/reception coil having a greatest amplitude of a received signal.

6. The magnetic inductance communication system of claim 4, wherein the selection circuit activates two of the driving circuits corresponding to a transmission/reception coils having a greatest amplitudes of received signals.

7. The magnetic inductance communication system of claim 6, wherein the modulator further includes at least one phase adjusting circuit receiving the carrier signal and a phase adjustment signal for adjusting the phase of the carrier signal provided to at least one of the two activated driving circuits so that the combined second magnetic field has a maximum value.

* * * * *